US012646284B2

(12) United States Patent 
Chaurasia et al.

(10) Patent No.: US 12,646,284 B2 
(45) Date of Patent: Jun. 2, 2026

(54) METHOD AND SYSTEM FOR RECORDING VIDEO USING REGION OF INTEREST SPECIFIC VIDEO RECORDING SETTINGS

(71) Applicant: Honeywell International Inc., Charlotte, NC (US)

(72) Inventors: Jitendra S. Chaurasia, Bengaluru (IN); Rajeev Sharma, Bengaluru (IN); Mourian Balasubramanian, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 329 days.

(21) Appl. No.: 18/296,737

(22) Filed: Apr. 6, 2023

(65) Prior Publication Data

US 2024/0338923 A1 Oct. 10, 2024

(51) Int. Cl.

| | |
|---|---|
| *G06V 10/25* | (2022.01) |
| *G06V 20/40* | (2022.01) |
| *H04N 5/76* | (2006.01) |
| *H04N 5/77* | (2006.01) |
| *H04N 7/18* | (2006.01) |
| *H04N 21/231* | (2011.01) |
| *H04N 21/234* | (2011.01) |
| *H04N 21/433* | (2011.01) |
| *H04N 21/44* | (2011.01) |
| *H04N 23/60* | (2023.01) |
| *H04N 23/667* | (2023.01) |

(52) U.S. Cl.
CPC .............. *G06V 10/25* (2022.01); *G06V 20/44* (2022.01); *H04N 23/64* (2023.01); *G06V 2201/07* (2022.01)

(58) Field of Classification Search
None
See application file for complete search history.

(56) References Cited

U.S. PATENT DOCUMENTS

| | | | |
|---|---|---|---|
| 8,150,155 B2 | 4/2012 | El-Maleh et al. | |
| 8,681,232 B2 | 3/2014 | Fan et al. | |
| 9,544,550 B1 | 1/2017 | Ni et al. | |
| 10,528,818 B1 | 1/2020 | Rao et al. | |

(Continued)

FOREIGN PATENT DOCUMENTS

WO        2022209098 A1    10/2022

OTHER PUBLICATIONS

Extended European Search Report, EP Application No. 24162929.4, European Patent Office, Sep. 6, 2024 (9 pages).

*Primary Examiner* — Hung Q Dang
(74) *Attorney, Agent, or Firm* — Seager, Tufte & Wickhem, LLP

(57) ABSTRACT

A video controller includes an input, an output and a controller that is configured to store two or more regions of interest defined relative to a field of view of an input video stream, first video recording settings for a first region of interest, and second video recording settings for a second region of interest. The controller applies the first video recording settings to the first region of interest of the input video stream, and sends a corresponding output for recording by a video recorder. The controller applies the second video recording settings to the second region of interest of the input video stream, and sends a corresponding output to the output for recording by the video recorder.

20 Claims, 9 Drawing Sheets

(56)            References Cited

U.S. PATENT DOCUMENTS

| | | | | |
|---|---|---|---|---|
| 10,630,893 | B2 | 4/2020 | Wexler et al. | |
| 2002/0005909 | A1* | 1/2002 | Sato | H04N 19/127 |
| | | | | 375/E7.064 |
| 2005/0271251 | A1* | 12/2005 | Russell | H04N 5/781 |
| | | | | 382/103 |
| 2007/0285820 | A1* | 12/2007 | Morita | H04N 5/91 |
| | | | | 386/E5.064 |
| 2008/0129844 | A1 | 6/2008 | Cusak et al. | |
| 2009/0303338 | A1* | 12/2009 | Chaurasia | H04N 5/2628 |
| | | | | 348/E7.003 |
| 2010/0079607 | A1* | 4/2010 | Won | H04N 23/64 |
| | | | | 348/E5.042 |
| 2010/0215098 | A1* | 8/2010 | Chung | H04N 19/20 |
| | | | | 375/E7.026 |
| 2010/0303365 | A1* | 12/2010 | Zhang | H04N 21/234363 |
| | | | | 382/203 |
| 2011/0057783 | A1* | 3/2011 | Yagi | G07C 5/085 |
| | | | | 348/148 |
| 2011/0058792 | A1* | 3/2011 | Towner | H04N 19/176 |
| | | | | 386/326 |
| 2011/0135151 | A1* | 6/2011 | Jang | H04N 19/12 |
| | | | | 382/173 |
| 2011/0235706 | A1 | 9/2011 | Demircin et al. | |
| 2012/0057802 | A1* | 3/2012 | Yuki | H04N 19/59 |
| | | | | 382/243 |
| 2017/0150148 | A1* | 5/2017 | Zhang | H04N 19/18 |
| 2017/0277967 | A1* | 9/2017 | Burke | G06V 10/255 |
| 2018/0091813 | A1* | 3/2018 | Ryu | G06T 5/70 |
| 2019/0007678 | A1* | 1/2019 | Perez-Ramirez | H04N 19/172 |
| 2019/0238859 | A1* | 8/2019 | Yonezawa | H04N 19/167 |
| 2022/0358744 | A1* | 11/2022 | Bae | G06T 7/246 |
| 2023/0050259 | A1* | 2/2023 | Hibino | H04N 23/617 |
| 2023/0239474 | A1* | 7/2023 | Shen | H04N 19/177 |
| | | | | 375/240.03 |

* cited by examiner

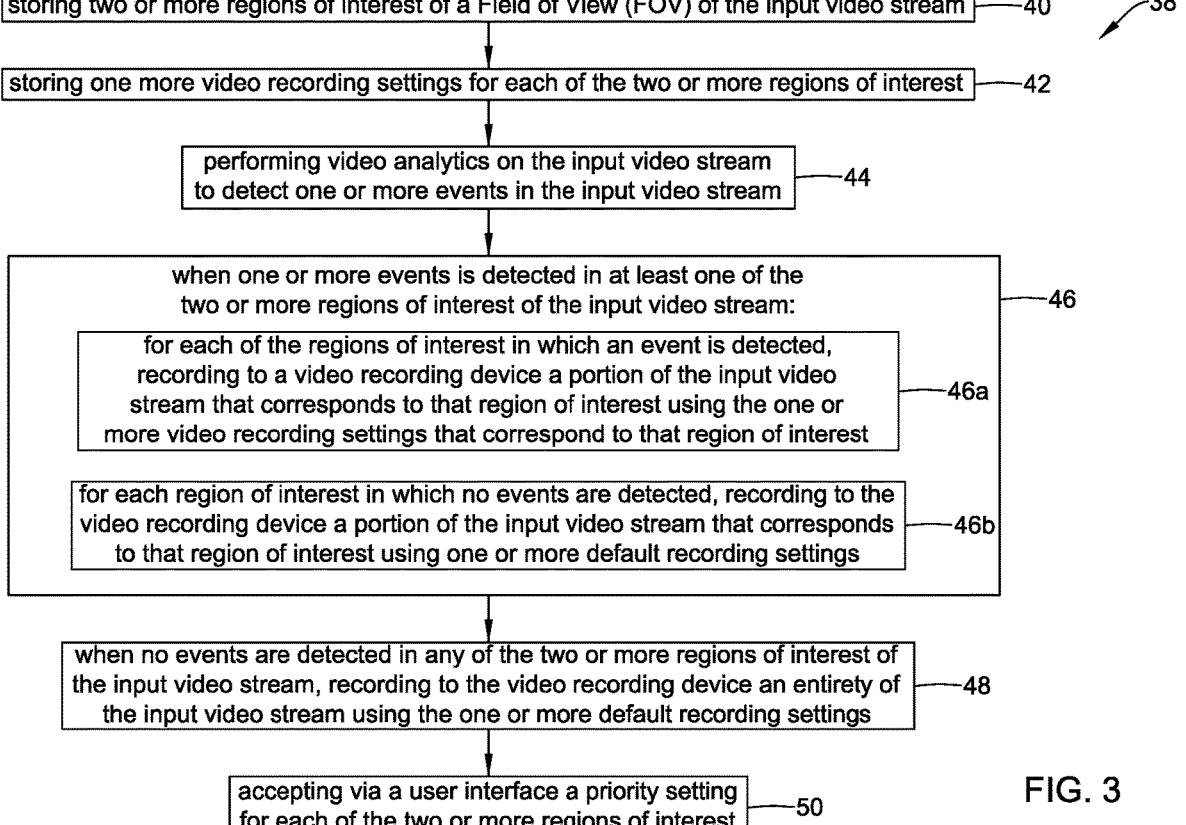

storing two or more regions of interest of a Field of View (FOV) of the input video stream ——40          38 storing one more video recording settings for each of the two or more regions of interest ——42 performing video analytics on the input video stream to detect one or more events in the input video stream ——44 when one or more events is detected in at least one of the two or more regions of interest of the input video stream: ——46 for each of the regions of interest in which an event is detected, recording to a video recording device a portion of the input video stream that corresponds to that region of interest using the one or more video recording settings that correspond to that region of interest ——46a for each region of interest in which no events are detected, recording to the video recording device a portion of the input video stream that corresponds to that region of interest using one or more default recording settings ——46b when no events are detected in any of the two or more regions of interest of the input video stream, recording to the video recording device an entirety of the input video stream using the one or more default recording settings ——48 accepting via a user interface a priority setting for each of the two or more regions of interest ——50

FIG. 3

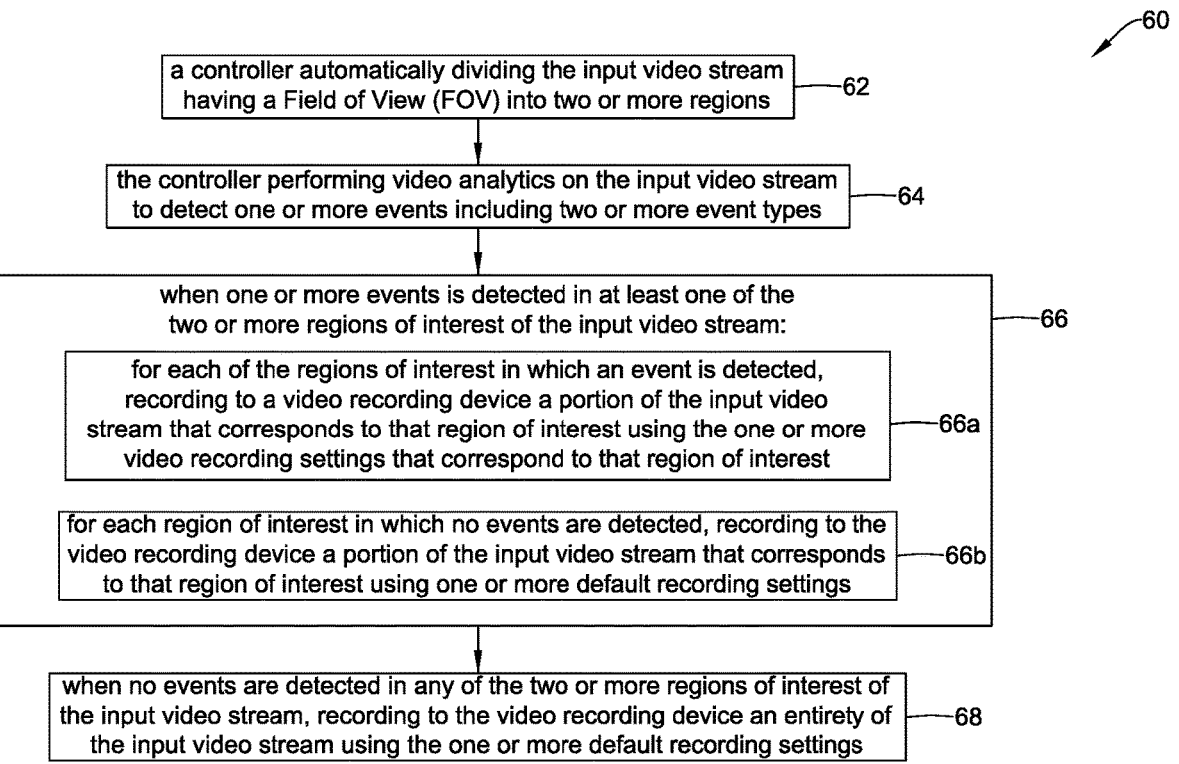

—60 a controller automatically dividing the input video stream
having a Field of View (FOV) into two or more regions —62 the controller performing video analytics on the input video stream
to detect one or more events including two or more event types —64 when one or more events is detected in at least one of the
two or more regions of interest of the input video stream: —66 for each of the regions of interest in which an event is detected,
recording to a video recording device a portion of the input video
stream that corresponds to that region of interest using the one or more
video recording settings that correspond to that region of interest —66a for each region of interest in which no events are detected, recording to the
video recording device a portion of the input video stream that corresponds
to that region of interest using one or more default recording settings —66b when no events are detected in any of the two or more regions of interest of
the input video stream, recording to the video recording device an entirety of
the input video stream using the one or more default recording settings —68

FIG. 5

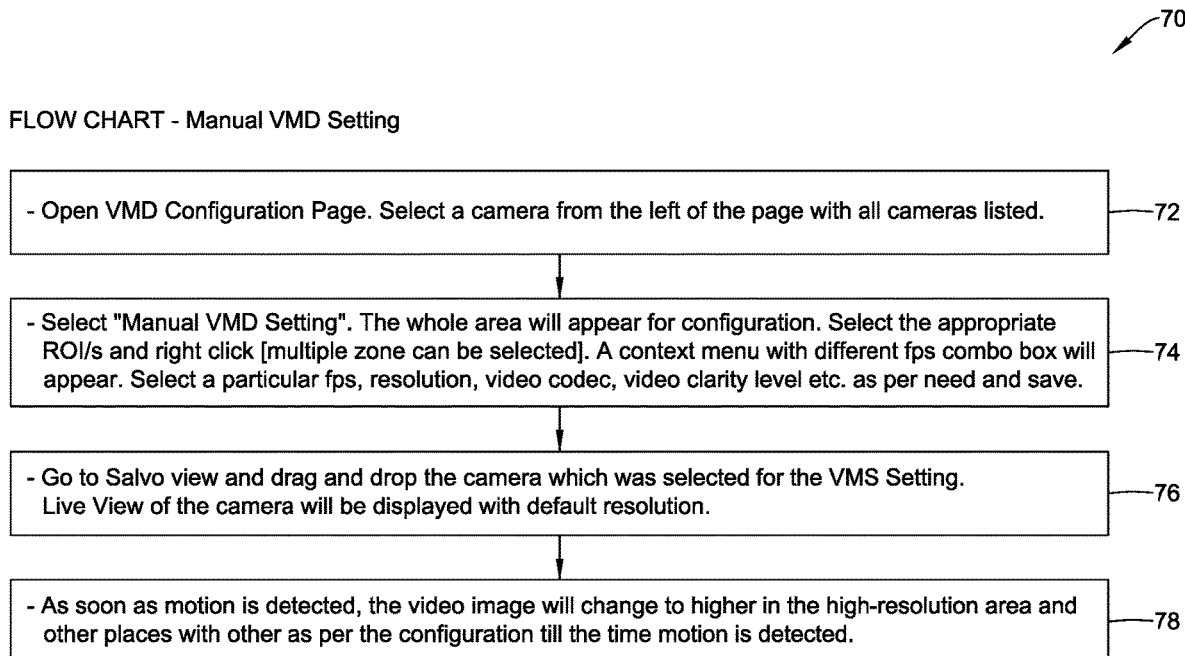

FLOW CHART - Manual VMD Setting

- Open VMD Configuration Page. Select a camera from the left of the page with all cameras listed. ——72

- Select "Manual VMD Setting". The whole area will appear for configuration. Select the appropriate ROI/s and right click [multiple zone can be selected]. A context menu with different fps combo box will appear. Select a particular fps, resolution, video codec, video clarity level etc. as per need and save. ——74

- Go to Salvo view and drag and drop the camera which was selected for the VMS Setting.
  Live View of the camera will be displayed with default resolution. ——76

- As soon as motion is detected, the video image will change to higher in the high-resolution area and other places with other as per the configuration till the time motion is detected. ——78

FIG. 6

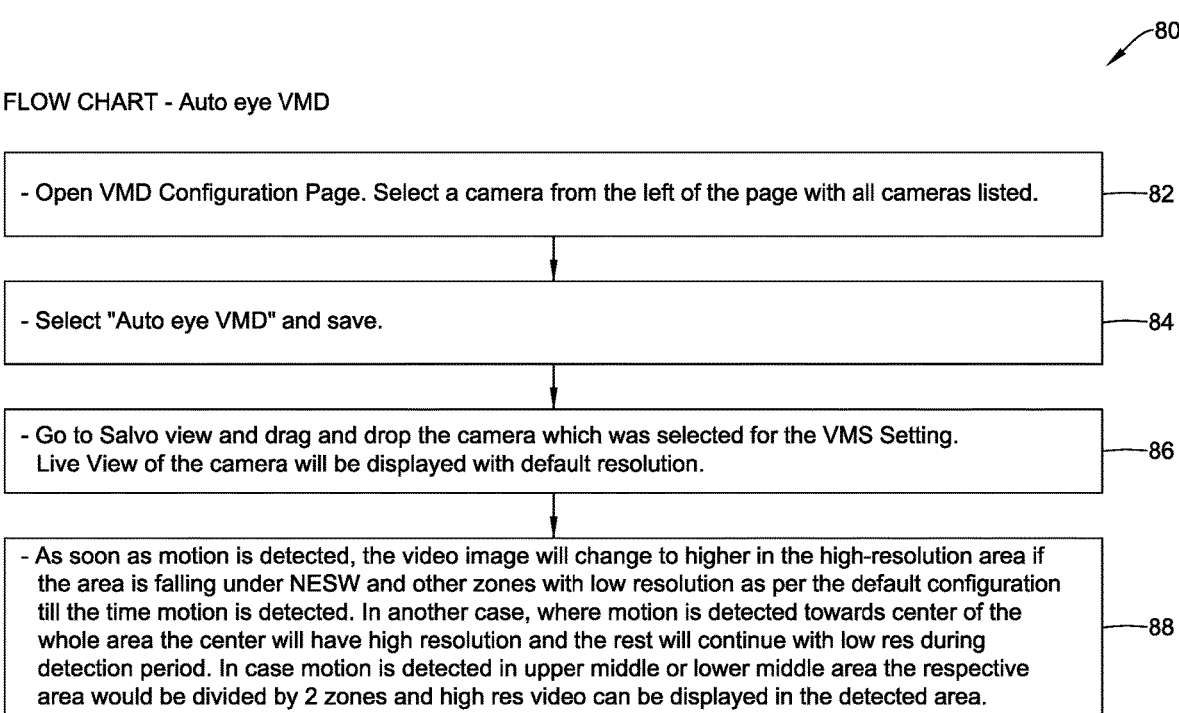

~80

FLOW CHART - Auto eye VMD

- Open VMD Configuration Page. Select a camera from the left of the page with all cameras listed.     —82

- Select "Auto eye VMD" and save.     —84

- Go to Salvo view and drag and drop the camera which was selected for the VMS Setting.
  Live View of the camera will be displayed with default resolution.     —86

- As soon as motion is detected, the video image will change to higher in the high-resolution area if
  the area is falling under NESW and other zones with low resolution as per the default configuration
  till the time motion is detected. In another case, where motion is detected towards center of the
  whole area the center will have high resolution and the rest will continue with low res during
  detection period. In case motion is detected in upper middle or lower middle area the respective
  area would be divided by 2 zones and high res video can be displayed in the detected area.     —88

FIG. 7

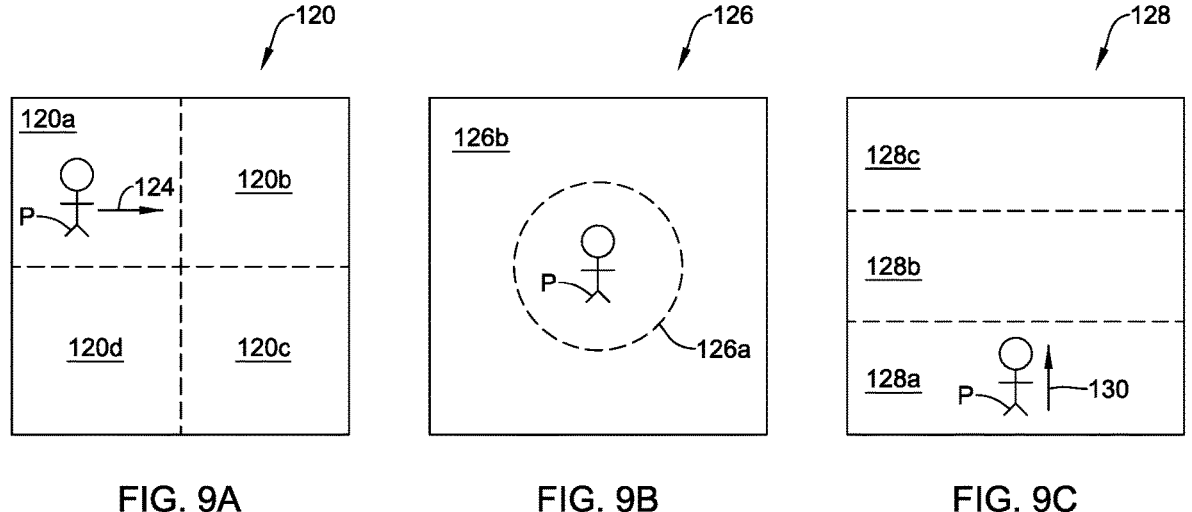
FIG. 9A                    FIG. 9B                    FIG. 9C

METHOD AND SYSTEM FOR RECORDING VIDEO USING REGION OF INTEREST SPECIFIC VIDEO RECORDING SETTINGS

TECHNICAL FIELD

The present disclosure relates generally to video recording systems. More particularly, the present disclosure relates to methods and systems for reducing storage space requirements for video streams in video recording systems.

BACKGROUND

A number of video recording systems store video streams that are provided by a variety of video cameras that are installed or otherwise arranged around a surveillance area such as a city, a portion of a city, a facility or a building. Recording all video streams with high video quality settings can consume substantial storage space in a video recording system, particularly when there are numerous video cameras. Recording all video at reduced video quality settings can save storage space, but the stored video may not be of sufficient quality to meet user needs. What would be desirable are systems and methods for reducing the storage space requirements of video streams while maintaining sufficient video quality to meet user needs.

SUMMARY

The present disclosure relates to video recording systems. More particularly, the present disclosure relates to video recording systems that allow use of region-of-interest specific video recording settings. An example may be found in a video controller. The illustrative video controller includes an input for receiving an input video stream encompassing a Field of View (FOV), an output and a controller that is operatively coupled to the input and the output. The controller is configured to store two or more regions of interest defined relative to the FOV of the input video stream, store one or more first video recording settings for a first one of the two or more regions of interest, and store one or more second video recording settings for a second one of the two or more regions of interest, wherein one or more of the second video recording settings is different from a corresponding one of the one or more first video recording settings. The controller is configured to apply the one or more first video recording settings to the first one of the two or more regions of interest of the input video stream, and send a corresponding output to the output for recording by a video recorder. The controller is configured to apply the one or more second video recording settings to the second one of the two or more regions of interest of the input video stream, and send a corresponding output to the output for recording by the video recorder.

Another example may be found in a method for conserving storage space when archiving an input video stream. The method includes storing two or more regions of interest of a Field of View (FOV) of the input video stream and storing one more video recording settings for each of the two or more regions of interest. Video analytics are performed on the input video stream to detect one or more events in the input video stream. When one or more events is detected in at least one of the two or more regions of interest of the input video stream, for each of the regions of interest in which an event is detected, the method includes recording to a video recording device a portion of the input video stream that corresponds to that region of interest using the one or more video recording settings that correspond to that region of interest. For each region of interest in which no events are detected, the method includes recording to the video recording device a portion of the input video stream that corresponds to that region of interest using one or more default recording settings. When no events are detected in any of the two or more regions of interest of the input video stream, the method includes recording to the video recording device an entirety of the input video stream using the one or more default recording settings.

Another example may be found in a method for conserving storage space when archiving an input video stream. The method includes a controller automatically dividing the input video stream having a Field of View (FOV) into two or more regions and the controller performing video analytics on the input video stream to detect one or more events. When one or more events is detected in at least one of the two or more regions of interest of the input video stream, for each of the regions of interest in which an event is detected, the method includes recording to a video recording device a portion of the input video stream that corresponds to that region of interest using the one or more video recording settings that correspond to that region of interest. For each region of interest in which no events are detected, the method includes recording to the video recording device a portion of the input video stream that corresponds to that region of interest using one or more default recording settings. When no events are detected in any of the two or more regions of interest of the input video stream, the method includes recording to the video recording device an entirety of the input video stream using the one or more default recording settings.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 3 is a flow diagram showing an illustrative method for conserving space when archiving an input video stream;

FIG. 5 is a flow diagram showing an illustrative method for conserving space when archiving an input video stream;

FIG. 6 is a flow diagram showing an illustrative method;

FIG. 7 is a flow diagram showing an illustrative method;

FIGS. 9A, 9B and 9C are schematic illustrations showing examples of automatic selection of regions of interest.

Figure 1:
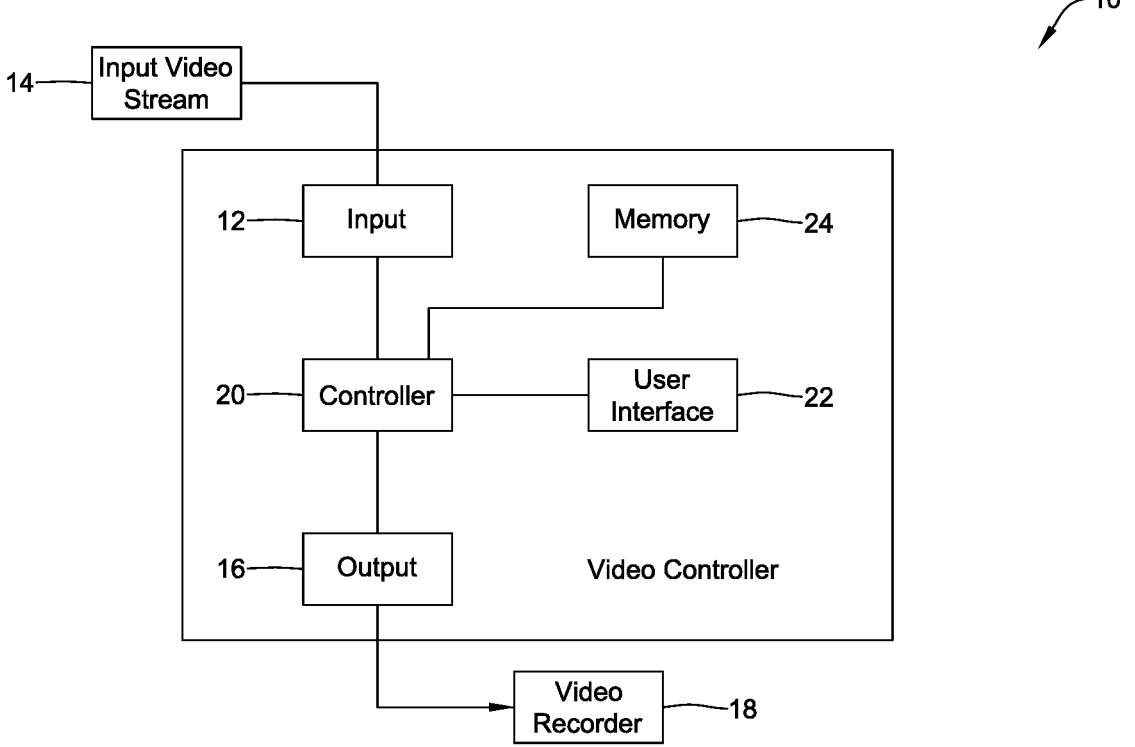
FIG. 1 is a schematic block diagram showing an illustrative video controller.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative video controller 10. The illustrative video controller 10 may include an input 12 for receiving an input video stream 14 that encompasses a Field of View (FOV). The input 12 may, for example, represent a network connection between the video controller 10 and the source of the input video stream 14. In some cases, the input 12 may be a jack configured to accept a coaxial or CAT5 cable, for example. In some cases, the input 12 may be configured to accommodate a fiber optic cable. In some cases, the input 12 may be wireless input for wirelessly receiving the input video stream 14. In some instances, the input video stream 14 may be provided directly from a video camera, while in other cases the input video stream 14 may be temporarily recorded before being provided to the video controller 10 for processing.

The video controller 10 includes an output 16. The output 16 may, for example, represent a network connection between the video controller 10 and a video recorder 18. In some cases, the output 16 may be a jack configured to accept a coaxial or CAT5 cable, for example. In some cases, the output 16 may be configured to accommodate a fiber optic cable. In some cases, the output 16 may be a wireless output that is configured to be wirelessly coupled to the video recorder 18. The video recorder 18 may, for example, represent long term video storage of captured video. In some instances, particularly if an event is subsequently detected, the captured video stored in long term video storage may be retrieved to look for additional information regarding the event.

The illustrative video controller 10 includes a controller 20 that is operatively coupled to the input 12 and to the output 16. In some instances, the video controller 10 may include a user interface 22. The user interface 22 may be used by a person monitoring the input video stream 14. In some cases, the user interface 22 may be used to enter video recording settings to be used by the controller 20. In some cases, the user interface 22 may be used by a user to select regions of interest within the FOV of the input video stream 14, as some parts or regions of the FOV may be of relatively greater interest while other parts or regions of the FOV may be of relatively lesser interest, for example. In some cases, the video controller 10 may include a memory 24 that is operatively coupled to the controller 20. The memory 24 may be used for storing video parameters. The memory 24 may be used for temporarily storing parts of the input video stream 14, for example.

Figure 2:
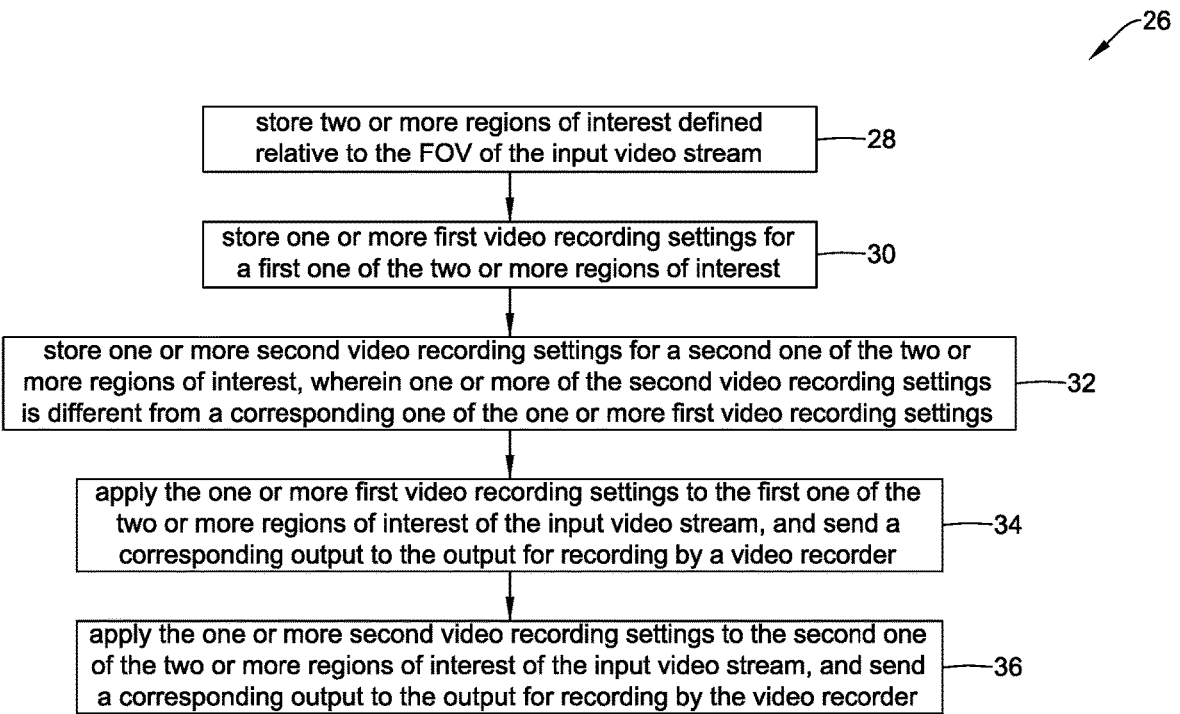
FIG. 2 is a flow diagram showing a series of steps that may be carried out by a controller forming a part of the illustrative video controller of FIG. 1.
Figure 4:
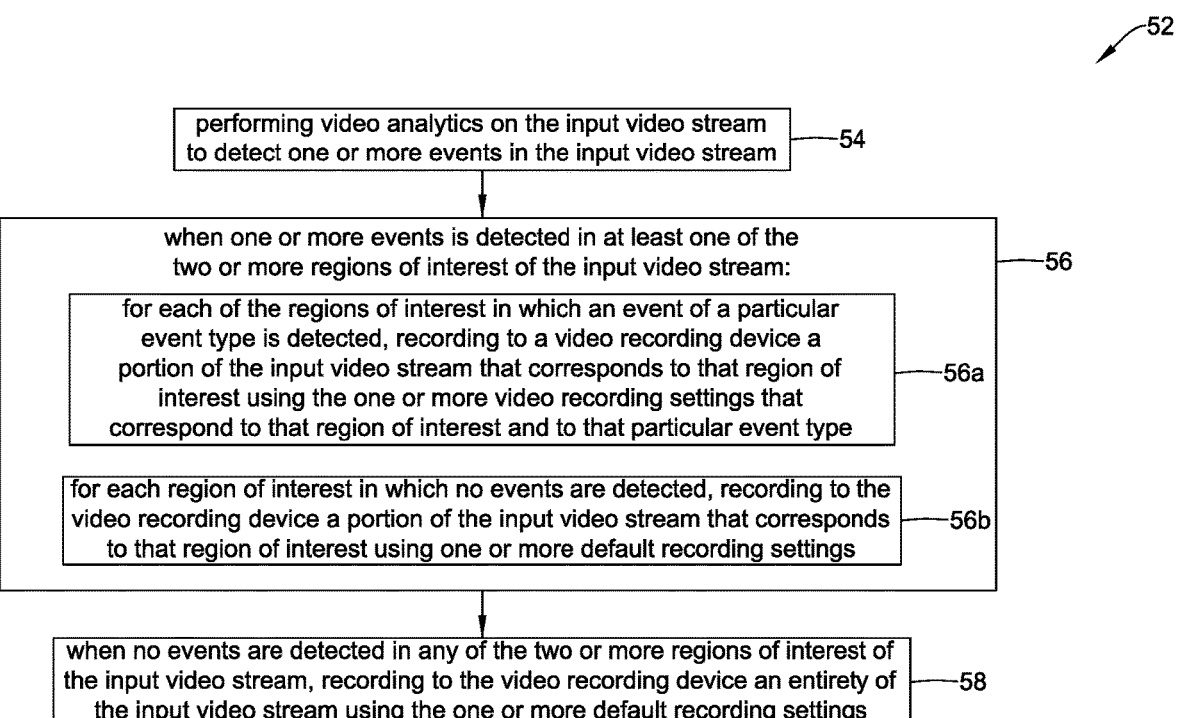
FIG. 4 is a flow diagram showing an illustrative method for conserving space when archiving an input video stream.

FIG. 2 is a flow diagram showing an illustrative series of steps 26 that the controller 20 may be configured to carry out. The controller 20 may be configured to store two or more regions of interest defined relative to the FOV of the input video stream, as indicated at block 28. In some cases, a user may define one or more of the regions of interest. In some cases, the remainder of the FOV of the input video stream that is not encompassed by the one or more regions of interest defined by the user may be considered one of the two or more regions of interest. In some cases, the remainder of the FOV of the input video stream that is not encompassed by the one or more regions of interest defined by the user may not be considered a region of interest.

The controller 20 may be configured to store one or more first video recording settings for a first one of the two or more regions of interest, as indicated at block 30. The controller 20 may be configured to store one or more second video recording settings for a second one of the two or more regions of interest, wherein one or more of the second video recording settings is different from a corresponding one of the one or more first video recording settings, as indicated at block 32. The one or more first video recording settings and the one or more second video recording settings may be stored in the memory 24.

In some instances, the one or more first video recording settings and/or the one or more second video recording settings may include one or more video quality settings. Examples of video quality settings include but are not limited to one or more of a resolution setting, a frames per second (FPS) setting and a video compression setting. Examples of video compression settings include but are not limited to one or more of a compression format setting, a compression amount setting, a bit depth setting, and a Group of Pictures (GOP) setting. In some instances, the one or more first video recording settings and/or the one or more second video recording settings may include a video format setting, wherein the video format setting includes, for example, one or more of a National Television System Committee (NTSC) setting, a Phase Alternating Line (PAL) setting, a Symposium of Episcopal Conferences of Africa and Madagascar (SECAM) setting and a Digital Video Broadcasting (DVB) setting.

In some cases, the one or more first video recording settings and/or the one or more second video recording settings may include one or more video recording time duration settings. In some cases, the one or more video recording time duration settings may include one or more of a pre-event duration setting and a post-event duration setting relative to an event detected in the input video stream. The pre-event duration setting, when provided, specifies how long before the detected event that the video controller should begin recording. The post-event duration setting, when provided, specifies how long after the detected event that the video controller should continue to record. It is contemplated that the video storage space may be significantly reduced by only recording detected events, while not recording the video stream when no detected events are present.

In some instances, an event may be detected by a video analytics algorithm applied to the input video stream (sometimes by the controller 20), wherein the video analytics algorithm may include one or more of a motion detection algorithm, an object detection algorithm, a face detection algorithm, a behavior detection algorithm, a health compliance detection algorithm, a safety compliance detection algorithm, a social distance algorithm, an isolated woman detection algorithm, a crowd detection algorithm, a dense crowd detection algorithm, an obstructed view detection algorithm, a jaywalking detection algorithm, a mask detection algorithm, a person fall detection algorithm, an underexposure detection algorithm, an over-exposure detection algorithm, a vehicle parking detection algorithm, and an object detection algorithm. These are just examples.

The controller 20 may be configured to apply the one or more first video recording settings to the first one of the two or more regions of interest of the input video stream, and send a corresponding output to the output 16 for recording by the video recorder 18, as indicated at block 34. The controller 20 may be configured to apply the one or more second video recording settings to the second one of the two or more regions of interest of the input video stream, and send a corresponding output to the output 16 for recording by the video recorder 18, as indicated at block 36.

In some instances, the controller 20 may be configured to receive user input via the user interface 22 to defines the two or more regions of interest. In some instances, the controller 20 may be configured to automatically define the two or more regions of interest. In some instances, the controller 20 may be configured to receive user input via the user interface 22 that sets one or more of the video recording settings for one or more of the regions of interest, such as the first video recording settings and/or the second video recording settings.

FIG. 3 is a flow diagram showing an illustrative method 38 for conserving storage space when archiving an input video stream (such as the input video stream 14). The method 38 includes storing two or more regions of interest of a Field of View (FOV) of an input video stream, as indicated at block 40. One or more video recording settings are stored for each of the two or more regions of interest, as indicated at block 42. Video analytics are performed on the input video stream to detect one or more events in the input video stream, as indicated at block 44.

When one or more events is detected in at least one of the two or more regions of interest of the input video stream, one of several things may occur, as indicated at block 46. For each of the regions of interest in which an event is detected, a portion of the input video stream that corresponds to that region of interest is recorded to a video recording device (such as video recorder 18 of FIG. 1) using the one or more video recording settings that correspond to that region of interest, as indicated at block 46a. In some cases, the one or more video recording settings that are applied may depend on the type of event that is detected. For example, the one or more video recording settings may include video recording settings that are applied in response to a face detection event and different video recording settings that are applied in response to a car detection event in the corresponding region of interest.

For each region of interest in which no events are detected, a portion of the input video stream that corresponds to that region of interest is recorded to a video recording device using one or more default recording settings, as indicated at block 46b. When no events are detected in any of the two or more regions of interest of the input video stream, an entirety of the input video stream may be recorded to the video recording device using the one or more default recording settings, as indicated at block 48. Alternatively, when no events are detected in any of the two or more regions of interest, none of the input video stream may be recorded to the video recording device. In some instances, the method 38 may further include accepting via the user interface a priority setting for each of the two or more regions of interest.

In some instances, the one or more default recording settings may include recording settings resulting in reduced video storage space on the video recording device relative to recording the portion of the input video stream that corresponds to that region of interest at the video recording settings that are set for that region of interest. In some instances, the one or more video recording settings include one or more of video resolution setting, a video quality setting, a frames per second (FPS) setting, a codec setting and Group of Pictures (GOP) setting. These are just examples.

FIG. 3 is a flow diagram showing an illustrative method 52 for conserving storage space when archiving an input video stream (such as the input video stream 14). The method 38 includes performing video analytics on the input video stream to detect one or more events in the input video stream, as indicated at block 54. When one or more events is detected in at least one of the two or more regions of interest of the input video stream, one of several things may occur, as indicated at block 56. For each of the regions of interest in which an event of a particular event type is detected, a portion of the input video stream that corresponds to that region of interest is recorded to a video recording device using the one or more video recording settings that correspond to that region of interest and sometimes to that particular event type, as indicated at block 56a. For each region of interest in which no events are detected, a portion of the input video stream that corresponds to that region of interest is recorded to a video recording device using one or more default recording settings, as indicated at block 56b. When no events are detected in any of the two or more regions of interest of the input video stream, an entirety of the input video stream is recorded to the video recording device using the one or more default recording settings, as indicated at block 58. Alternatively, when no events are detected in any of the two or more regions of interest, none of the input video stream may be recorded to the video recording device.

FIG. 5 is a flow diagram showing an illustrative method 60 for conserving storage space when archiving an input video stream (such as the input video stream 14). The method 60 includes a controller (such as the controller 20) automatically dividing the input video stream having a Field of View (FOV) into two or more regions, as indicated at block 62. The controller performs video analytics on the input video stream to detect one or more events, as indicated at block 64. When one or more events is detected in at least one of the two or more regions of interest of the input video stream, several actions occur, as indicated at block 66. For each of the regions of interest in which an event is detected, a portion of the input video stream that corresponds to that region of interest is recorded to a video recording device using the one or more video recording settings that correspond to that region of interest, as indicated at block 66*a*. For each region of interest in which no events are detected, a portion of the input video stream that corresponds to that region of interest is recorded to the video recording device using one or more default recording settings, as indicated at block 66*b*. When no events are detected in any of the two or more regions of interest of the input video stream, an entirety of the input video stream is recorded to the video recording device using the one or more default recording settings, as indicated at block 68. Alternatively, when no events are detected in any of the two or more regions of interest, none of the input video stream may be recorded to the video recording device.

In some instances, the controller may automatically divide the input video stream into two or more regions based on detected events. In some cases, a relative size and position of each of the two or more regions are dependent on where in the FOV one or more events are detected. In some instances, the controller may automatically divide the input video stream into four quadrants. In some instances, the controller may automatically divide the input video stream into a center region and one or more surrounding regions. In some instances, the controller may automatically divide the input video stream into a top region, a middle region and a bottom region.

FIG. 6 is a flow diagram showing an illustrative method 70 for manually configuring VMD (Video Motion Detection). The method 70 includes a step of opening a configuration page and selecting a particular camera, as indicated at block 72. In some cases, this may be done using the user interface 22 of FIG. 1. The user is able to select "Manual VMD Settings" and then is able to select/define ROIs (Region of Interest). The user is able to input a variety of video recording settings applicable to each of the selected/defined ROIs, as indicated at block 74. The user is then able to go to a Salvo view, which shows a live image from the selected camera. This image will be displayed using default video settings, as indicated at block 76. As soon as motion is detected, the displayed video will be displayed using higher video quality (e.g. resolution, frame rate, etc.) settings in the ROI in which motion was detected, as indicated at block 78. The other ROIs where no motion is detected will still be displayed using the default video settings.

FIG. 7 is a flow diagram showing an illustrative method 80 for selecting Auto Eye VMD (Video Motion Detection). The method 80 includes a step of opening a configuration page and selecting a particular camera, as indicated at block 82. The user is able to select Auto Eye VMD, as indicated at block 84. The Auto Eye VMD automatically defined various regions of interest without requiring that the user define the regions of interest. The user is then able to go to a Salvo view, which shows a live image from the selected camera. This image will be displayed using default video settings, as indicated at block 86. As soon as motion is detected in the FOV, the displayed video will be displayed using higher video quality (e.g. resolution, frame rate, etc.) settings for the automatically defined ROI in which motion was detected, and the other ROIs with no motion detected will be displayed using default video settings. In some cases, how the Field of View (FOV) of the video camera is automatically divided into ROIs will depend on where the motion was detected, as indicated at block 88. The FOV may be divided into four quadrants, if motion is detected in one or more quadrants. The FOV may be divided into a top region, a middle region and a bottom region, if motion is detected in one of those three regions. The FOV may be divided into a center region and a surrounding region, if motion is detected in the center region. These are just examples.

Figure 8:
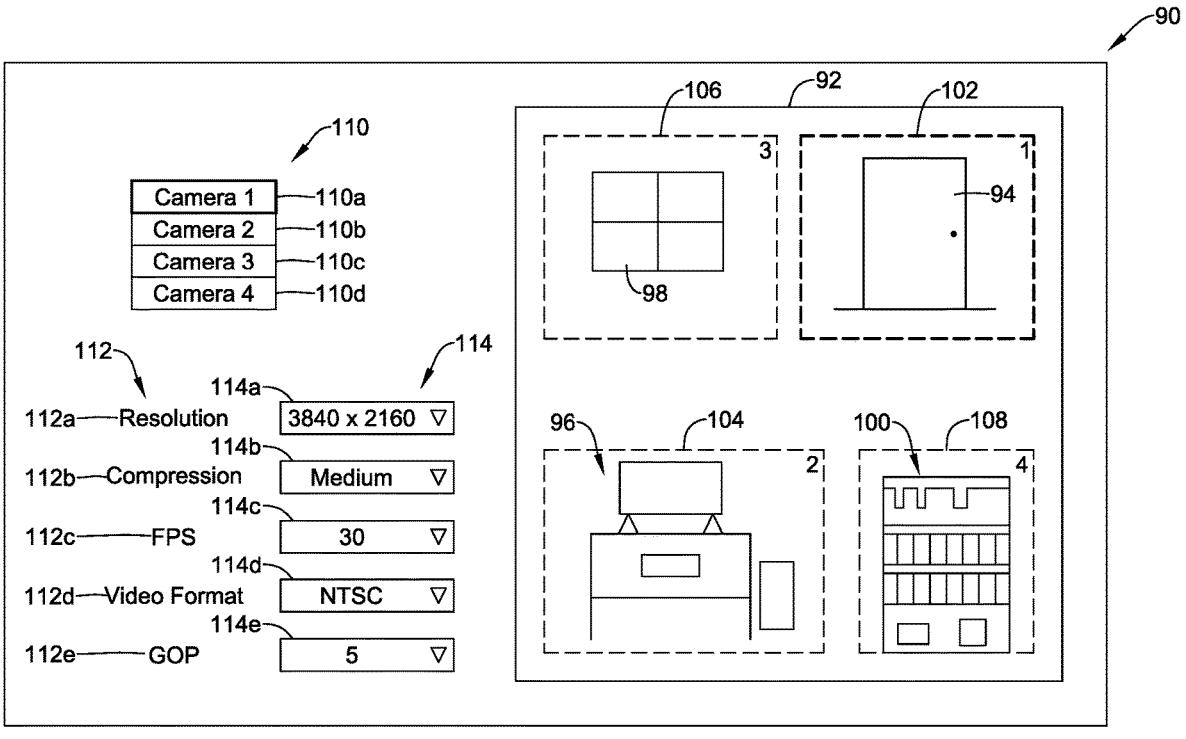
FIG. 8 is a schematic screen display that may be displayed on a user interface, such as user interface 22 of FIG. 1.

FIG. 8 is a schematic representation of an illustrative screen shot 90 that may be displayed when a user is manually selecting/defining ROIs (Region Of Interest) within a FOV of a selected camera, as well as selecting/defining various video parameters to be used within the ROIs when an event is detected. In some cases, an event may correspond to movement, although other events may also be considered. The screen shot 90 shows a video image 92 that includes a door 94, a desk 96, a window 98 and a bookcase 100. A region of interest 102 has been drawn around the door 94, a region of interest 104 has been drawn around the desk 96, a region of interest 106 has been drawn around the window 98 and a region of interest 108 has been drawn around the bookcase 100. While a total of four regions of interest 102, 104, 106 and 108 are shown, this is merely illustrative. The user may define any number of regions of interest, depending on the relative importance of various parts of the displayed video image 92. In some cases, the user may draw boxes to define each of the regions of interest 102, 104, 106 and 108. In some cases, the user may draw any closes shape to define each of the regions of interest 102, 104, 106 and 108. In some cases, the user may assign relative priority values to each of the regions of interest 102, 104, 106 and 108. As shown, the region of interest 102 has been assigned a priority value of "1", the region of interest 104 has been assigned a priority value of "2", the region of interest 106 has been assigned a priority value of "3" and the region of interest 108 has been assigned a priority value of "4". These are just examples.

The screen shot 90 includes a listing of cameras 110, individually labeled as 110*a*, 110*b*, 110*c* and 110*d*. As can be seen, the camera 110*a* is highlighted, indicating that the video image 92 is being provided by the camera 110*a*. The screen shot 90 includes a listing of video recording settings 112, individually labeled as 112*a*, 112*b*, 112*c*, 112*d* and 112*e*. A corresponding listing of pull-down menu buttons 114 allow a user to make selections for each of the video recording settings 112 that correspond to the selected region of interest, such as selected region of interest 102. As shown, the region of interest 102 within the video image 92 is highlighted, meaning that the user is currently selecting video recording settings for the various video recording settings 112 to be used when an event such as motion is detected within the region of interest 102. The user may highlight other regions of interest, and may utilize corresponding listing of video recording settings 112 and pull-down menu buttons 114 to set video recording settings to be used when an event such as motion is detected within other regions of interest of the video image 92.

As noted, when ROIs (Region Of Interest) are automatically selected/defined by the video controller 10 (e.g. via the Auto Eye feature), the boundary and video recording settings of each of the ROIs may vary, depending on where in the video image an event such as motion is detected. FIG. 9A schematically shows a video image 120 that has been automatically divided into quadrants 120*a*, 120*b*, 120*c* and 120*d* because movement of a person P has been detected within the quadrant 120*a*. If the person P is moving in a direction indicated by an arrow 124, it will be appreciated that while the detected movement is currently in the quadrant 120*a*, the movement will likely soon be detected in the quadrant 120*b* instead. As the quadrant in which movement is detected changes, the relative video recording settings by which each quadrant of the video image 120 are recorded and/or displayed will change accordingly.

FIG. 9B schematically shows a video image 126 that has been automatically divided into a center region 126*a* and a surrounding region 126*b* because movement of a person P has been detected within the center region 126*a*. FIG. 9C schematically shows a video image 128 that has been automatically divided into a lower region 128*a*, a middle region 128*b* and an upper region 128*c* because movement of a person P has been detected within the lower region 128*a*. If the person P is moving in a direction indicated by an arrow 130, it will be appreciated that while the detected movement is currently in the lower region 128*a*, the movement will likely soon be detected in the middle region 128*b*, and perhaps later in the upper region 128*c*. As the region in which movement is detected changes, the relative video recording settings by which each quadrant of the video image 126 are recorded and/or displayed will change accordingly.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A video controller comprising:
an input;
an output;
a controller operatively coupled to the input and the output, the controller configured to:
receive an input video stream encompassing a Field of View (FOV) via the input;
automatically detect an event in the input video stream using video analytics;
automatically select one of a plurality of predefined region of interest (ROI) configurations based at least in part on where the event is detected in the FOV of the input video stream, wherein each of the plurality of predefined ROI configurations divides the FOV of the input video stream into a corresponding predefined arrangement of two or more regions of interest, wherein the predefined arrangements of two or more regions of interest are defined independently among the plurality of predefined ROI configurations;
store one or more first video recording settings for a first one of the two or more regions of interest of the select one of the plurality of predefined region of interest (ROI) configurations;
store one or more second video recording settings for a second one of the two or more regions of interest of the select one of the plurality of predefined region of interest (ROI) configurations, wherein one or more of the second video recording settings is different from a corresponding one of the one or more first video recording settings;
apply the one or more first video recording settings to the first one of the two or more regions of interest of the input video stream, and send an output that corresponds to the first one of the two or more regions of interest of the select one of the plurality of predefined region of interest (ROI) configurations to the output for recording by a video recorder; and
apply the one or more second video recording settings to the second one of the two or more regions of interest of the input video stream, and send an output that corresponds to the second one of the two or more regions of interest of the select one of the plurality of predefined region of interest (ROI) configurations to the output for recording by the video recorder.

2. The video controller of claim 1, wherein the one or more first video recording settings and/or the one or more second video recording settings comprise one or more video quality settings.

3. The video controller of claim 2, wherein the one or more video quality settings comprise one or more of a resolution setting, a frames per second (FPS) setting and a video compression setting.

4. The video controller of claim 3, wherein the video compression setting comprises one or more of a compression format setting, a compression amount setting, a bit depth setting, and a Group of Pictures (GOP) setting.

5. The video controller of claim 1, wherein the one or more first video recording settings and/or the one or more second video recording settings comprise a video format setting, wherein the video format setting includes one or more of a National Television System Committee (NTSC) setting, a Phase Alternating Line (PAL) setting, a Symposium of Episcopal Conferences of Africa and Madagascar (SECAM) setting and a Digital Video Broadcasting (DVB) setting.

6. The video controller of claim 1, wherein the one or more first video recording settings and/or the one or more second video recording settings comprise one or more video recording time duration settings.

7. The video controller of claim 1, wherein the one or more video recording time duration settings comprise one or more of a pre-event duration setting and a post-event duration setting relative to an event detected in the input video stream.

8. The video controller of claim 7, wherein the video analytics algorithm comprises one or more of a motion detection algorithm, an object detection algorithm, a face detection algorithm, a behavior detection algorithm, a health compliance detection algorithm, a safety compliance detection algorithm, a social distance algorithm, an isolated woman detection algorithm, a crowd detection algorithm, a dense crowd detection algorithm, an obstructed view detection algorithm, a jaywalking detection algorithm, a mask detection algorithm, a person fall detection algorithm, an under-exposure detection algorithm, an over-exposure detection algorithm, a vehicle parking detection algorithm, and an object detection algorithm.

9. The video controller of claim 1, wherein one of the plurality of predefined region of interest (ROI) configurations divide the FOV of the input video stream into four quadrants, wherein each quadrant corresponds to a corresponding region of interest, and is automatically selected when the event is detected in one of the four quadrants.

10. The video controller of claim 1, wherein one of the plurality of predefined region of interest (ROI) configurations divide the FOV of the input video stream into a lower region of interest, a middle region of interest and an upper region of interest, and is selected when the event is detected in an upper middle or lower middle of the FOV.

11. The video controller of claim 1, wherein one of the plurality of predefined region of interest (ROI) configurations divide the FOV of the input video stream into a center region of interest and one or more surrounding region of interests, and is selected when the event is detected in a middle of the FOV.

12. The video controller of claim 1, wherein the event comprises one or more of motion detection, object detection, face detection, behavior detection, health compliance detection, safety compliance detection, social distance detection, crowd detection, jaywalking detection, mask detection, person fall detection, exposure detection, or vehicle parking detection.

13. The method of claim 1, wherein the event comprises one or more of motion detection, object detection, face detection, behavior detection, health compliance detection, safety compliance detection, social distance detection, crowd detection, jaywalking detection, mask detection, person fall detection, exposure detection, or vehicle parking detection.

14. A method for conserving storage space when archiving an input video stream, the method comprising:
    storing a plurality of predefined region of interest (ROI) configurations, wherein each of the plurality of predefined ROI configurations divides a Field of View (FOV) of the input video stream into a corresponding predefined arrangement of two or more regions of interest;
    performing video analytics on the input video stream to automatically detect one or more events in the input video stream;
    automatically selecting one of the plurality of predefined region of interest (ROI) configurations based at least in part on where the one or more events are detected in the FOV of the input video stream, wherein the predefined arrangements of two or more regions of interest are defined independently among the plurality of predefined ROI configurations;
    for each of the regions of interest of the select one of the plurality of predefined region of interest (ROI) configurations in which an event is detected, recording to a video recording device a portion of the input video stream that corresponds to that region of interest using one or more video recording settings that correspond to that region of interest;
    for each region of interest of the select one of the plurality of predefined region of interest (ROI) configurations in which no events are detected, recording to the video recording device a portion of the input video stream that corresponds to that region of interest using one or more default recording settings; and
    when no events are detected in the input video stream, recording to the video recording device an entirety of the input video stream using the one or more default recording settings.

15. The method of claim 14, wherein the one or more events include two or more event types, and wherein each event type includes corresponding one or more video recording settings, wherein when one or more events of a particular event type is detected in at least one of the two or more regions of interest of the select one of the plurality of predefined region of interest (ROI) configurations:
    for each of the regions of interest in which the event of the particular event type is detected, recording to the video recording device the portion of the input video stream that corresponds to that region of interest using the one or more video recording settings that correspond to that region of interest and to that particular event type.

16. The method of claim 14, wherein the one or more default recording settings comprise recording settings resulting in reduced video storage space on the video recording device relative to recording the portion of the input video stream that corresponds to that region of interest.

17. The method of claim 14, wherein the one or more video recording settings include one or more of video resolution setting, a video quality setting, a frames per second (FPS) setting, a codec setting and Group of Pictures (GOP) setting.

18. The method of claim 14, further comprising accepting via a user interface a priority setting for each of the two or more regions of interest.

19. A method for conserving storage space when archiving an input video stream encompassing a Field of View (FOV), the method comprising:
    a controller automatically detecting one or more events of interest in the input video stream using video analytics;
    the controller automatically selecting one of a plurality of predefined region of interest (ROI) configurations based on where the one or more events are detected in the FOV of the input video stream, wherein each of the plurality of predefined ROI configurations divides the FOV of the input video stream into a corresponding predefined arrangement of two or more regions of interest, wherein the predefined arrangements of two or more regions of interest are defined independently among the plurality of predefined ROI configurations;
    for each of the regions of interest of the selected one of the plurality of predefined region of interest (ROI) configurations in which an event is detected, recording to a video recording device a portion of the input video stream that corresponds to that region of interest using the one or more video recording settings that correspond to that region of interest;
    for each region of interest of the selected one of the plurality of predefined region of interest (ROI) configurations in which no events are detected, recording to the video recording device a portion of the input video stream that corresponds to that region of interest using one or more default recording settings; and
    when no events are detected in the input video stream, recording to the video recording device an entirety of the input video stream using the one or more default recording settings.

20. The method of claim 19, wherein the plurality of predefined region of interest (ROI) configurations include one or more of:
    four quadrants;
    a center region and one or more surrounding regions; and
    a top region, a middle region and a bottom region.

* * * * *